3,394,089
ION EXCHANGE CATALYST FOR THE
PREPARATION OF BISPHENOLS
Boyd Wayne McNutt and Benny Bryan Gammill, Lake
Jackson, Tex., assignors to The Dow Chemical Company, Midland, Mich., a corporation of Delaware
No Drawing. Filed Dec. 2, 1964, Ser. No. 415,501
12 Claims. (Cl. 260—2.2)

ABSTRACT OF THE DISCLOSURE

Modification of an insoluble strong-acid cation-exchange resin in acid form by partial neutralization with a mercaptoamine yields an improved catalyst for the preparation of bisphenols by condensation of a phenol and a ketone.

This invention relates to an improved resin catalyst for the preparation of bisphenols and particularly bisphenol A. More specifically, the improved catalyst is an insoluble strong-acid cation-exchange resin in acid form modified by partial neutralization with a mercaptoamine.

Sulfur compounds have long been recognized as effective promoters for the acid catalyzed condensation of phenols and ketones to form bisphenols. For example, in U.S. Patent 2,359,242 Perkins and Bryner describe the use of $H_2S$ in the condensation of phenol with acetone, methyl ethyl ketone, cyclohexanone, and other similar ketones. In U.S. Patent 2,917,550 Dietzler recommends as a promoter a soluble ionizable sulfur compound such as $H_2S$, methyl mercaptan, ethyl mercaptan, or n-octyl mercaptan.

Such soluble promoters however introduce subsequent problems in the purification of the bisphenol. Particularly when the bisphenol is used in the synthesis of epoxy and polycarbonate resins, its purity is a critical factor. Extensive processing is often required. Thus the search for improved catalysts, greater process efficiency and enhanced product color, odor and purity continues.

Recently Apel, Conte and Bender disclosed in U.S. Patents 3,049,568 and 3,153,001 a resin catalyst prepared by partial esterification of a substantially anhydrous strong-acid cation-exchange resin with a lower alkyl mercaptoalcohol. By chemically bonding the mercaptan promoter to the insoluble resin by esterification, contamination of the product with the mercaptan is reduced.

It has now been discovered that partial neutralization of a strong-acid cation-exchange resin with a $C_1-C_4$ alkyl mercaptoamine provides another new and improved resin catalyst for the preparation of bisphenols. As illustrated by the following equation for partial neutralization of a sulfonated aromatic resin with 2-mercaptoethylamine:

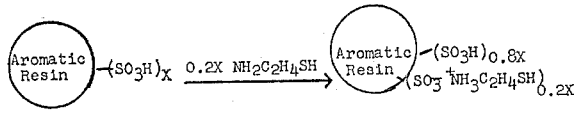

the mercaptan promoter is incorporated as a sulfonic acid salt. This partial neutralization not only increases the efficiency of the strong-acid resin as a catalyst but also since the mercaptoamine is tightly held by the resin, it minimizes product contamination and improves the product quality. Furthermore the partially neutralized resin catalyst is stable in the presence of water. In fact it is readily prepared by treatment of an aqueous slurry of strong-acid cation-exchange resin with the mercaptoamine. Also the enhanced catalytic activity obtained by partial neutralization with a mercaptoamine is not destroyed by brief treatment of the modified catalyst with dilute HCl.

Resin catalyst

The improved catalyst of the present invention can be prepared using any insoluble strong-acid cation-exchange resin. Particularly suitable are aromatic sulfonic acid resins having a cation-exchange capacity of at least 0.5 and advantageously 2.0 or more meq./g. dry weight. Commercial strong-acid resins prepared by the sulfonation of a styrene-divinylbenzene resin, as described for example, by Bodamer in U.S. Patent 2,597,438 or by Wheaton and Harrington in U.S. Patent 2,642,417, are most satisfactory. Such commercial sulfonic acid resins as Dowex 50 resin, Amberlite IR–120 resin, Amberlyst 15 resin and Duolite C–20 resin, which normally have an exchange capacity of 4.2–5.2 meq./g. dry weight, make superior resin catalysts after partial neutralization. The standard 20–50 mesh resin beads are very suitable as a fixed bed catalyst.

The commercial aromatic sulfonic acid resins are normally handled in sodium form. While an exchange reaction can occur between the resin in salt form and the mercaptoamine, loss of the mercaptoamine is likely during the subsequent conversion of the modified resin into the free acid form essential for the catalysts. Thus the strong-acid resins are preferably converted to the acid form by conventional means prior to treatment with the mercaptoamine.

Suitable mercaptoamines for the partial neutralization of the strong-acid cation-exchange resin are $C_1-C_4$ alkyl mercaptoamines such as 2-mercaptoethylamine, 2-mercaptoisopropylamine and 3-mercaptobutylamine. While mercaptoamines having primary amino groups are preferred, secondary and tertiary amines are also effective in the partial neutralization. Normally these $C_1-C_4$ alkyl mercaptoamines are prepared and isolated as an amine salt, often as the hydrochloride. Since these amine salts undergo a facile exchange reaction with the slurry of water-swollen resin, they can be used directly in the preparation of the modified resin catalyst. However, the free mercaptoamines are of course also suitable.

To obtain the improved cation-exchange resin catalyst, the strong-acid resin is partially neutralized with the $C_1-C_4$ alkyl mercaptoamine either by direct neutralization of the free acid resin with the mercaptoamine or by exchange with its amine salt. Either reaction is essentially quantitative and can be carried out by adding a calculated amount of the alkyl mercaptoamine to an aqueous slurry of the resin in acid form. The degree of neutralization is readily verified by measuring the ion exchange capacity of the resin before and after partial neutralization.

In practice, neutralization of about 5–25 mole percent of the strong-acid groups of the cationexchange resin is desirable. A higher degree of neutralization impairs the catalyst efficiency. Particularly effective catalysts are obtained by neutralizing 15–20 percent of the cation-exchange capacity of a sulfonated aromatic resin having an initial exchange capacity of about 4.5–5.2 meq./g. dry weight H+ form, giving thereby a modified resin having a capacity of about 3.6–4.4 meq./g. dry weight, H+ form.

The water content of the partially neutralized catalyst is an important process variable. Although some water is always present as a by-product of the phenol-ketone condensation, the catalyst efficiency is impaired if the water content of the reactant mixture is greater than about 2–3 weight percent. When using a continuous reactor with a fixed resin bed, a steady state water content based on the amount of water in the effluent is preferably about 0.5–1.0 weight percent. Thus to achieve optimum results the partially neutralized resin should be dehydrated prior to use. This can be achieved by such conventional means as oven drying or azeotropic distillation. Particularly when the modified resin is used in a fixed bed continuous reactor, the resin catalyst can be dried by pretreating the resin bed with anhydrous phenol. Thereafter, the mole ratio and feed rates of the reactants can be adjusted to achieve a suitable conversion and eluent water content.

The strong-acid resin catalyst modified by partial neutralization with a mercaptoamine retains its desired properties as a catalyst for the preparation of bisphenols well during extended use. Its stability is reflected in continued high conversions and consistent product quality during more than 500 hours of continuous operation. Furthermore it has been found that when conversion drops because of gradual catalyst contamination from the process stream, the catalyst activity can be recovered by washing the catalyst with dilute hydrochloric acid and redrying. The desired effect of the mercaptoamine promoter is retained during this regeneration.

Reactants

The partially neutralized cation-exchange resin described herein is an effective catalyst for the preparation of many bisphenols. The phenolic reactant must be unsubstituted in the para position, but can be substituted with one or more alkyl, halo, or other similar non-reactive groups in the positions ortho and meta to the phenolic group. Suitable phenols include phenol, o- and m-cresol, o- and m-chlorophenol, o-bromophenol, o-sec.-butylphenol, o-t-butylphenol, 2,6-dibromophenol, 2,6-di-t-butylphenol, 6-chloro-o-cresol, and o-phenylphenol.

As the ketone reactant, methyl ketones such as acetone, methyl ethyl ketone, methyl isobutyl ketone and acetophenone are preferred. However cyclohexanone and other cyclic ketone as well as halo substituted methyl ketones like 1,3-dichloroacetone can also be used.

As noted above, the process is sensitive to the total water content. Therefore the reactants should contain less than 0.5 weight percent water and preferably 0.1 to 0.2 weight percent or less.

Reaction conditions

The preparation of bisphenols using the partially neutralized strong-acid cation-exchange resin described herein as catalyst occurs readily under the normal conditions for the condensation of a phenol and ketone using a conventional soluble catalyst. An excess of phenol is generally desirable to achieve a high conversion of the ketone. Thus from 2–20 moles of the phenol per mole of ketone are normally used with optimum conversions and efficiencies being obtained with a feed ratio of about 5–15 moles of phenol per mole of ketone.

The partially neutralized resin catalyst can be slurried with the reactants in a batch process or used in a conventional fixed bed column for continuous operation. The condensation in the presence of the modified catalyst occurs at temperatures ranging from 0° to 120° C. and preferably at about 45° to 100° C. At the lower temperatures an inert diluent may be required to maintain fluidity. Normally atmospheric pressure is used.

The reaction time depends of course on the reaction temperature and the method of operation. In a batch process a reaction time of from 0.1 to 20 hours or more may be required to achieve a desired conversion. In continuous operation using a fixed bed of catalyst a flow rate of about 0.2 to 6.0 bed volumes per hour or an average contact time of about 0.16 to 5.0 hours is suitable. Using a partially neutralized catalyst having a residual exchange capacity of about 3.2–4.5 meq./g. dry weight, optimum results are obtained with a feed rate of about 1.2 to 3.0 bed volumes per hour at 60°–80° C.

After separating the product mixture from the insoluble catalyst, the bisphenol is readily recovered by conventional means. Normally water, excess phenol, and other light impurities are removed by flash distillation. The residual crude bisphenol has a minimum purity of 95 percent, good color and is uncontaminated with residual catalyst or promoters. Additional purification by distillation crystallization, solvent washing and similar techniques readily give a product having a purity of 99+ percent.

To illustrate further the present invention and its advantages, the following examples are given without limiting the invention thereto. Unless otherwise specified, all parts and percentages are by weight.

Example I.—Catalyst preparation

To a stirred slurry of 1.5 liters (about 2.5 equivalents) of a wet sulfonic acid cation-exchange resin in acid form (Dowex 50W resin, H+ form, 1.7 meq./ml. wet resin, 4.89 meq./g. dry resin) in about an equal volume of water was added over a period of 4 hours a solution of 44.6 g. (0.393 mole; 15.7 mole percent based on total resin capacity) of mercaptoethylamine hydrochloride in 60 ml. of distilled water. The slurry was maintained at about 85° C. during the addition and for several hours thereafter to insure complete exchange. Then excess water was drained from the promoted, partially neutralized resin. The residual exchange capacity of a sample of the promoted resin was 4.12 meq./g. dry resin, 84.3 percent of the initial capacity, corresponding to an essentially quantitative partial neutralization by the added mercaptoamine.

Example II.—Bisphenol A

A. A jacketed glass resin column was charged with 600 ml. of the promoted resin described in Example 1. After drying the resin catalyst by flushing the resin bed with 4–5 volumes of phenol preheated to 95–100° C., the bed was classified by back washing with 1 to 2 bed volumes of hot phenol. The catalyst was then ready for use.

In operation the reaction temperature was controlled by preheating the feed and circulating hot water through the reactor jacket. Then after steady state conditions were achieved in the column for a given reaction temperature and feed rate, samples of the product stream were analyzed by standard methods.

B. Typical data from a series of runs on the preparation of bisphenol A by the condensation of phenol and acetone using the partially neutralized catalyst and for comparison similar runs using unmodified Dowex 50W resin with and without a standard soluble promoter, n-octyl mercaptan, added to the feed mixture are given in Table I. The bisphenol A analyses were obtained by stripping unreacted acetone and excess phenol to a pot temperature of 200–210° C. at 1–3 mm. Hg and analyzing the residual crude bisphenol A by standard chromatographic and spectrographic methods. The percent o,p'-bisphenol A was determined by a vapor phase chromatographic method described by H. Gill in Anal. Chem., 36, 1201 (1964). The APHA color was determined in methanol solution using a Klett colorimeter calibrated to the standard APHA (American Public Health Association) scale.

TABLE I.—BISPHENOL A

| Run | Reaction Conditions | | | Percent Acetone Conversion | Bisphenol A | | |
|---|---|---|---|---|---|---|---|
| | Catalyst | Temp., °C. | Feed Rate Bed Vol./hr. | | Wt. percent in Effluent | Percent o,p'- | APHA Color |
| 2-1 | Promoted Resin | 60-80 | 3.52 | 37.7 | 11.4 | 4.4 | 135 |
| 2-2 | do | 60-80 | 2.50 | 44.9 | 13.4 | 9.5 | 195 |
| 2-3 | do | 65-80 | 1.37 | 59.8 | 17.9 | 5.0 | 200 |
| 2-4 | do | 70-80 | 0.75 | 72.7 | 21.8 | 5.4 | 310 |
| 2-5 | Resin+RSH [1] | 65-80 | 3.43 | 25.5 | 7.5 | 5.6 | 640 |
| 2-6 | do | 65-80 | 2.16 | 35.2 | 10.4 | 6.1 | 593 |
| 2-7 | do | 70-80 | 0.81 | 55.0 | 16.3 | 6.8 | 655 |
| 2-8 | Resin alone | 60-75 | 3.00 | 10.2 | 3.0 | 12.0 | 935 |
| 2-9 | do | 65-75 | 2.10 | 18.8 | 5.6 | 13.4 | 935 |
| 2-10 | do | 70-80 | 1.43 | 22.2 | 6.8 | 13.4 | 1,045 |
| 2-11 | do | 70-80 | 1.22 | 24.5 | 7.3 | 11.1 | 1,260 |

[1] 4% n-Octyl mercaptan dissolved in feed.

C. It is evident from the results shown in Table I that the promoted catalyst gives both an increased conversion to bisphenol A and improved product quality as shown by the decrease in undesired o,p'-isomer and the reduced color. Similar results are observed when the strong-acid cation-exchange resin partially neutralized with an alkyl mercaptoamine is used for the synthesis of other bisphenols.

We claim:

1. In a process for the preparation of a bisphenol by the condensation of a phenol and a ketone in the presence of a strong acid catalyst, the improvement which consists essentially in using as the acid catalyst in the condensation of the phenol and ketone an insoluble strong acid cation-exchange resin in acid form modified by the neutralization of 5–25% of its cation-exchange capacity with a $C_1$–$C_4$ alkyl mercaptoamine.

2. The process of claim 1 wherein the catalyst is a partially neutralized sulfonated styrene-divinylbenzene resin having an initial cation-exchange capacity of at least 2.0 meq./g. dry resin H+ form.

3. The process of claim 2 wherein the sulfonated resin is partially neutralized with 2-mercaptoethylamine.

4. The process of claim 3 wherein the modified resin has residual ion exchange capacity of 3.6–4.4 meq./g. dry resin H+ form.

5. The process of claim 4 wherein the phenolic reactant is phenol.

6. The process of claim 4 wherein the ketone is acetone.

7. The process of claim 4 wherein the product is bisphenol A.

8. A process for the preparation of bisphenol A by contacting a mixture of phenol and acetone containing from 5 to 15 moles of phenol per mole of acetone at a temperature of 45°–100° C. with a partially neutralized insoluble sulfonic acid cation-exchange resin in acid form, said resin being obtained by neutralizing about 5–25% of the ion-exchange capacity of a sulfonic acid resin having an ion-exchange capacity of at least 2.0 meq./g. dry weight with a $C_1$–$C_4$ alkyl mercaptoamine, and thereafter recovering bisphenol A.

9. The process of claim 8 wherein the partially neutralized catalyst is obtained by neutralizing from 15 to 20% of the initial ion exchange capacity of the sulfonic acid resin with 2-mercaptoethylamine.

10. A modified cation-exchange resin useful as a catalyst for the preparation of bisphenols which consists essentially of a strong-acid cation-exchange resin having a capacity of at least 2.0 meq./g. dry weight H+ form modified by partial neutralization with a $C_1$–$C_4$ alkyl mercaptoamine.

11. The product of claim 10 wherein the strong-acid cation-exchange resin is an insoluble sulfonated styrene-divinylbenzene resin.

12. The produce of claim 10 wherein the strong-acid cation-exchange resin is modified by neutralization of 5–25% of its cation-exchange capacity with 2-mercaptoethylamine.

References Cited

UNITED STATES PATENTS 3,049,568   8/1962   Apel et al. _____ 260—619
3,153,001   10/1964  Apel et al. _____ 260—2.2

OTHER REFERENCES

Fieser & Fieser, Organic Chemistry, N.Y., Heath & Co., 1950, p. 627.

WILLIAM H. SHORT, *Primary Examiner.*

M. GOLDSTEIN, *Assistant Examiner.*